(12) United States Patent
Sprickmann Kerkerinck et al.

(10) Patent No.: US 10,599,226 B2
(45) Date of Patent: Mar. 24, 2020

(54) OPERATING SYSTEM AND METHOD FOR OPERATING AN OPERATING SYSTEM FOR A MOTOR VEHICLE

(71) Applicant: AUDI AG, Ingolstadt (DE)

(72) Inventors: Paul Sprickmann Kerkerinck, Ingolstadt (DE); Onofrio Di Franco, Ditzingen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/574,781

(22) PCT Filed: Apr. 15, 2016

(86) PCT No.: PCT/EP2016/000617
§ 371 (c)(1),
(2) Date: Nov. 16, 2017

(87) PCT Pub. No.: WO2016/184539
PCT Pub. Date: Nov. 24, 2016

(65) Prior Publication Data
US 2018/0150141 A1 May 31, 2018

(30) Foreign Application Priority Data
May 21, 2015 (DE) .................. 10 2015 006 613

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *B60K 37/06* (2013.01); *G06F 3/165* (2013.01);
(Continued)

(58) Field of Classification Search
CPC ..... G06F 3/017; G06F 3/165; G06K 9/00832; G06K 9/00389; G06K 9/00355; B60K 35/00; B60K 2350/1052
See application file for complete search history.

(56) References Cited

U.S. PATENT DOCUMENTS 6,266,061 B1 *  7/2001  Doi .................. G06F 3/017
                                                345/156
8,897,496 B2 * 11/2014  Hildreth .............. G06F 3/017
                                                382/103

(Continued)

FOREIGN PATENT DOCUMENTS

CN      103303224 A     9/2013
CN      104603720 A     5/2015
(Continued)

OTHER PUBLICATIONS

English Language Translation of the International Preliminary Report on Patentability by WIPO dated Nov. 23, 2017 in corresponding International Patent Application No. PCT/EP2016/000617.
(Continued)

*Primary Examiner* — Mihir K Rayan
(74) *Attorney, Agent, or Firm* — Staas & Halsey LLP

(57) ABSTRACT

A sensing device sensing at least one body part of a user when the body part is arranged in a sensing region of the sensing device is included in an operator control system that also includes a control device controlling a signal apparatus of the operator control system. The sensing device checks whether the body part sensed in the sensing region is in an operator control space that forms a sub-region of the sensing region. The control device actuates the signal apparatus that is used outside the operator control space to output an acknowledgment when the sensing device senses that the body part is inside the operator control space.

19 Claims, 2 Drawing Sheets

(51) Int. Cl.
  *G06K 9/00* (2006.01)
  *G06F 3/16* (2006.01)
  *B60K 37/06* (2006.01)
(52) U.S. Cl.
  CPC ..... *G06K 9/00355* (2013.01); *G06K 9/00389* (2013.01); *G06K 9/00832* (2013.01); *B60K 2370/146* (2019.05); *B60K 2370/1464* (2019.05); *B60K 2370/73* (2019.05)

(56) References Cited

U.S. PATENT DOCUMENTS

| | | | | |
|---|---|---|---|---|
| 9,317,134 | B2* | 4/2016 | Clarkson | G06F 3/017 |
| 2004/0193413 | A1* | 9/2004 | Wilson | G06F 3/017 704/243 |
| 2008/0163130 | A1* | 7/2008 | Westerman | G06F 3/04883 715/863 |
| 2009/0027337 | A1* | 1/2009 | Hildreth | G06F 3/03 345/158 |
| 2011/0080490 | A1* | 4/2011 | Clarkson | G06F 3/017 348/222.1 |
| 2011/0141009 | A1* | 6/2011 | Izumi | A63F 13/04 345/156 |
| 2012/0146903 | A1* | 6/2012 | Arihara | G06F 3/011 345/158 |
| 2014/0267004 | A1* | 9/2014 | Brickner | G06F 3/017 345/156 |
| 2014/0361989 | A1 | 12/2014 | Entenmann et al. | |
| 2015/0212581 | A1* | 7/2015 | Kawalkar | G06F 3/017 701/3 |
| 2015/0234470 | A1* | 8/2015 | Rosenstock | B60K 37/00 701/36 |
| 2016/0349850 | A1* | 12/2016 | Tsuda | B60K 37/06 |
| 2018/0059798 | A1* | 3/2018 | Matsubara | G02B 27/0101 |

FOREIGN PATENT DOCUMENTS

| | | | | |
|---|---|---|---|---|
| DE | 100 39 432 C1 | 12/2001 | | |
| DE | 10 2012 021 220 A1 | 4/2014 | | |
| DE | 10 2012 216 193 A1 | 5/2014 | | |
| DE | 10 2013 000 081 A1 | 7/2014 | | |
| DE | 10 2013 009 567 A1 | 12/2014 | | |
| DE | 10 2013 012 466 A1 | 1/2015 | | |
| EP | 3 260 331 A1 | 12/2017 | | |
| JP | WO2016132876 | * | 8/2016 | G06G 3/0488 |
| WO | WO2014040930 | * | 3/2014 | G06F 3/017 |

OTHER PUBLICATIONS

International Search Report for PCT/EP2016/000617 dated Jul. 14, 2016.
Office Action for German Application No. 10 2015 006 613.7 dated Jan. 27, 2016.
PCT/EP2016/000617, Apr. 15, 2016, Paul Sprickmann Kerkerinck et al., Audi AG.
DE102015006613.7, May 21, 2015, Paul Sprickmann Kerkerinck et al., Audi AG.
Office Action dated Apr. 3, 2018, in corresponding Chinese Patent Application No. 201680017384.5, 8 pgs.
Chinese Office Action for Chinese Application No. 201680017384.5 dated Aug. 9, 2018.
European Examination Report for European Application No. 16722047.4 dated Mar. 8, 2019.
Chinese Office Action dated Dec. 9, 2019 in corresponding Chinese Patent Application No. 201680017384.5.

* cited by examiner

OPERATING SYSTEM AND METHOD FOR OPERATING AN OPERATING SYSTEM FOR A MOTOR VEHICLE

CROSS REFERENCE TO RELATED APPLICATIONS

This application is the U.S. national stage of International Application No. PCT/EP2016/000617, filed Apr. 15, 2016 and claims the benefit thereof. The International Application claims the benefit of German Application No. 10 2015 006 613.7 filed on May 21, 2015, both applications are incorporated by reference herein in their entirety.

BACKGROUND

Described below is an operator control system for a motor vehicle. In this case, the operator control system includes a sensing device that is designed to sense at least one body part of a user when the body part is arranged in a sensing region of the sensing device. Furthermore, the operator control system includes a control device that is designed to actuate a signal apparatus of the operator control system.

The related art discloses operator control systems that are controlled by gestures of a user inside a sensing region. To orient the user so that he can more easily find the sensing region in which he can execute a gesture to operate the operator control system, the sensing region or at least one system limit of the sensing region can be signaled or displayed to the user by a cone of light or by a beam of light, respectively.

DE 10 2013 009 567 A1 reveals a method for operating a gesture recognition device in a motor vehicle, for example. In this case, the gesture recognition device performs a gesture recognition only if a gesticulating hand is in a predetermined sub-volume of the vehicle interior. Further, the operator is assisted in locating the sub-volume by virtue of a light source shining a beam of light into the sub-volume. In this regard, the beam of light hits the hand of the operator when the hand is arranged in the sub-volume.

US 2014/0361989 A1 describes a method for operating functions in a vehicle using gestures executed in the three-dimensional space. The method includes determining whether a first gesture performed in the three-dimensional space is sensed by an image-based sensing process. The method further involves determining whether the first gesture is a gesture associated with activation of control of a function. If the relevant gestures are sensed, a function associated with the gesture is executed.

DE 10 2013 012 466 A1 reveals an operator control system for a/multiple vehicle-based apparatus(es). The operator control system includes a sensor apparatus for capturing image data from a hand in the sensing region in the sensor apparatus and for transmitting the captured image data to an evaluation apparatus. Further, the operator control system contains a memory apparatus that stores hand gestures and actions associated with hand gestures, an evaluation apparatus that evaluates the image data and a control apparatus that executes the action associated with a hand gesture.

SUMMARY

It is desirable to assist a user particularly well in the operation of a gesture-controlled operator control system and thereby to increase the reliability of the gesture control.

Described below is an operator control system for a motor vehicle which includes a sensing device that is designed to sense at least one body part of a user when the body part is arranged in a sensing region of the sensing device. The sensing region is a three-dimensional region in the surroundings of the sensing device that can be covered by the sensing device. By way of example, the sensing device can include a camera, particularly a 2D camera and/or a 3D camera. The sensing region of the camera may be stipulated by the visual angle of the camera, for example.

Further, the operator control system has a control device that is designed to control a signal apparatus of the operator control system. The operator control system is distinguished in that the sensing device is designed to check whether the body part sensed in the sensing region is in an operator control space that forms a sub-region of the sensing region. The operator control space is therefore arranged inside the sensing region of the sensing device. The operator control space is a subspace inside the three-dimensional region that can be sensed by the sensing device, for example. The sensing device may thus be in predetermined surroundings and, therein, sense a predetermined three-dimensional region—what is known as the sensing region—in which an operator control space stipulated by the sensing device is in turn arranged as a subspace of the three-dimensional region.

Furthermore, the operator control system is also distinguished in that the control device is designed to actuate the signal apparatus such that the signal apparatus is used outside the operator control space to output an acknowledgment when the sensing device senses that the body part is inside the operator control space. If the user wishes to operate the operator control system, for example, that is to say to execute a function by the operator control system, then it is first of all necessary for a body part of the user, for example his hand, to be inside the operator control space and to be detected therein by the sensing device. By way of example, image data can be evaluated by the camera in a manner known per se. Once the camera has captured the hand in the operator control space, data are transmitted to the control device by the camera, for example. It is then possible for the control device to actuate the signal apparatus accordingly, which signal apparatus can then output an acknowledgment. In this case, the data transmission can be effected wirelessly or by wire. The signal apparatus may include a display device and/or an audible output device. The display device can have one or more lamps and/or a display, for example, so that the display device can be used to display visual signals. The audible output device can have one or more loudspeakers, for example, so that the audible output device can be used to output audible signals. An acknowledgment may be the lighting of the lamp in the form of a visual signal and/or an audible signal from a loudspeaker, for example. Thus, once the hand of the user is sensed in the operator control space, the lamp lights up yellow, for example. This results in the advantage that the user is provided with direct feedback in the form of an acknowledgment when positioning his hand.

Also described below is a method for operating an operator control system for a motor vehicle in which a body part of a user is first of all sensed by a sensing device when the body part is arranged in a sensing region of the sensing device. Furthermore, a check is performed to determine whether the body part sensed in the sensing region is in an operator control space that forms a sub-region of the sensing region. Subsequently, a signal apparatus of the operator control system is actuated by a control device such that the signal apparatus is used outside the operator control space to output an acknowledgment when the sensing device senses that the body part is inside the operator control space.

One advantageous embodiment provides for the sensing device further to be designed to sense a gesture in the operator control space and to check whether the sensed gesture matches at least one prescribed gesture. Thus, not only the presence of a body part in the operator control space is sensed by the sensing device, but also a gesture executed by the user. In the case of a camera, for example, the gesture can be evaluated on the basis of video data. This results in the advantage that the sensing device not only outputs a direct acknowledgment when sensing a body part, but is simultaneously designed to evaluate gestures.

Advantageously, the control device is designed to actuate the signal apparatus such that the signal apparatus is used to output a confirmation signal if the sensed gesture matches the at least one prescribed gesture. The confirmation signal can be output as a visual and/or audible signal by the signal apparatus. Thus, as already mentioned above, if the hand of the user is sensed in the operator control space, for example, the lamp lights up yellow. If it is subsequently sensed that the user uses his hand to execute a prescribed gesture, the color of the lamp can change from yellow to green as a confirmation signal. The user thus knows that the gesture he has just executed has been recognized as an operator control gesture. "Prescribed gesture" means a gesture stored or deposited in a memory device of the sensing device for example. The prescribed gestures may thus be stored or deposited in a memory device of the sensing device, for example. To this end, video data may be stored or deposited, for example. Hence, the sensed gesture, i.e. video data captured by the camera, for example, can be compared with deposited video data, i.e. stored video data. If the captured video data match the deposited video data, a gesture is recognized as a prescribed gesture. This results in the advantage that the user of the operator control system is provided with a direct acknowledgment in a particularly simple manner when he operates the operator control system.

In order to be advised of any operator control actions inside the operator control space, that is to say including when an operating error, i.e. an incorrect gesture, is sensed, one advantageous embodiment provides for the control device to be designed to actuate the signal apparatus such that the signal apparatus is used to output a warning if the sensed gesture differs from the at least one prescribed gesture. The warning signal can be output as a visual and/or audible signal by the signal apparatus. Thus, if a prescribed gesture is not sensed, for example after the sensing of a gesture by the user, for example as a result of gesticulation with his hand, it is possible for the lamp of the signal apparatus to change not from yellow to green, for a prescribed gesture, but rather from yellow to red in the event of an operating error, that is to say an unprescribed gesture. To this end, the camera can compare captured video data with deposited video data, for example, in this case too. If the captured video data do not match the deposited video data, a gesture is recognized as an operating error. This results in the advantage that a user can react directly to when he has operated the operator control system incorrectly.

The signal apparatus may also include two display devices in the form of two lamps that may be arranged next to one another. The first lamp can indicate a visual acknowledgment for the sensing of the body part in the operator control space, for example, that is to say that the lamp would glow yellow. The second lamp can output a visual confirmation signal and/or a visual warning signal, for example. If the user reaches into the operator control space, for example, then this is indicated to him by the first lamp, which glows yellow at this moment and for as long as the user has his hand in the operator control space. If the user subsequently executes a gesture, for example, and this is sensed as a prescribed gesture, then the second lamp lights up green. Were the hand of the user to be admittedly in the operator control space but to execute an operating error, that is to say not to execute a prescribed gesture with his hand, then a second lamp would glow red. Instead of the two lamps, the signal apparatus can include a lamp and a loudspeaker, for example, so that the visual signal of the lamp is boosted by an audible signal. The signal apparatus can have a display with an illuminated frame. To this end, a translucent frame having a light source in the form of an optical fiber, for example, may be arranged around an outer contour of the display. This allows the user to track his actual operator control processes on the display. The illuminable frame allows the user, as already described using the example with the lamp, to comprehend his sensed operator control action, that is to say whether he is in the operator control space, for example, and whether his gesture has been executed correctly or incorrectly.

Advantageously, the control device is designed to actuate the signal apparatus such that the signal apparatus is used to output an identification signal if the sensing device is used to sense that the body part is admittedly inside the sensing region but outside the operator control space. The sensing signal can be output as a visual and/or audible signal by the signal apparatus. Thus, the signal apparatus, for example, is used to indicate to the user that he is admittedly in the sensing region of the sensing device but not yet in the operator control space when he wishes to operate the operator control system. This results in the advantage that a user can easily check the position of his hand when operating the operator control system. Further, this allows the robustness and reliability of the gesture recognition to be increased, since the sensing device can already identify and track a body part of the user, for example an arm or a hand or a finger, outside the operator control space and can thereby detect the ingress of the body part in the operator control space more reliably.

One advantageous embodiment provides for the control device to be designed to alter the extent and/or arrangement of the operator control space on the basis of at least one prescribed criterion. In this case, extent means the physical extent of the operator control space inside the sensing region of the sensing device. In this case, arrangement means a positioning of the operator control space inside the sensing region. For setting the extent and/or the arrangement of the operator control space, the prescribed criterion may be, by way of example, a stored user profile, e.g. on the vehicle key. The stored user profile can include the height of the driver and/or a preferred seat position, for example.

If the operator control space is above a central console in the interior of a motor vehicle, for example, then the extent of the operator control space can be adapted depending on the seat position of the user in the motor vehicle. If the operator control space is initially set for a first seat position for a first user, for example, then the operator control space is adapted to the arm length of the user, so that the user can reach into the operator control space when he extends his arm. If the user changes and were the seat position to be moved from the first seat position away from the operator control space into a second seat position, the user in the second seat position might now not be able to reach the operator control space comfortably. In this regard, depending on the seat position, the extent of the operator control space could be adapted, in this case enlarged. That is to say that the extent of the operator control space can increase the further the seat moves from the steering wheel, for example. This results in the advantage that the operator control space can be individually adapted for each user of the operator control system. Simultaneous assistance for the driver in operating the operator control system results in a convenient operator control system for every user.

Further advantages, features and details of the invention will emerge from the description of exemplary embodiments below and on the basis of the drawing. The features and combinations of features cited in the description above and the features and combinations of features shown in the description of the figures below and/or in the figures alone can be used not only in the respectively indicated combination but also in other combinations or on their own without departing from the scope of the invention.

The advantages and developments previously described in connection with the operator control system can be transferred to the method.

BRIEF DESCRIPTION OF THE DRAWINGS

These and other aspects and advantages will become more apparent and more readily appreciated from the following description of the exemplary embodiments, taken in conjunction with the accompanying drawings, of which.

DETAILED DESCRIPTION OF THE PREFERRED EMBODIMENT

Figure 1:
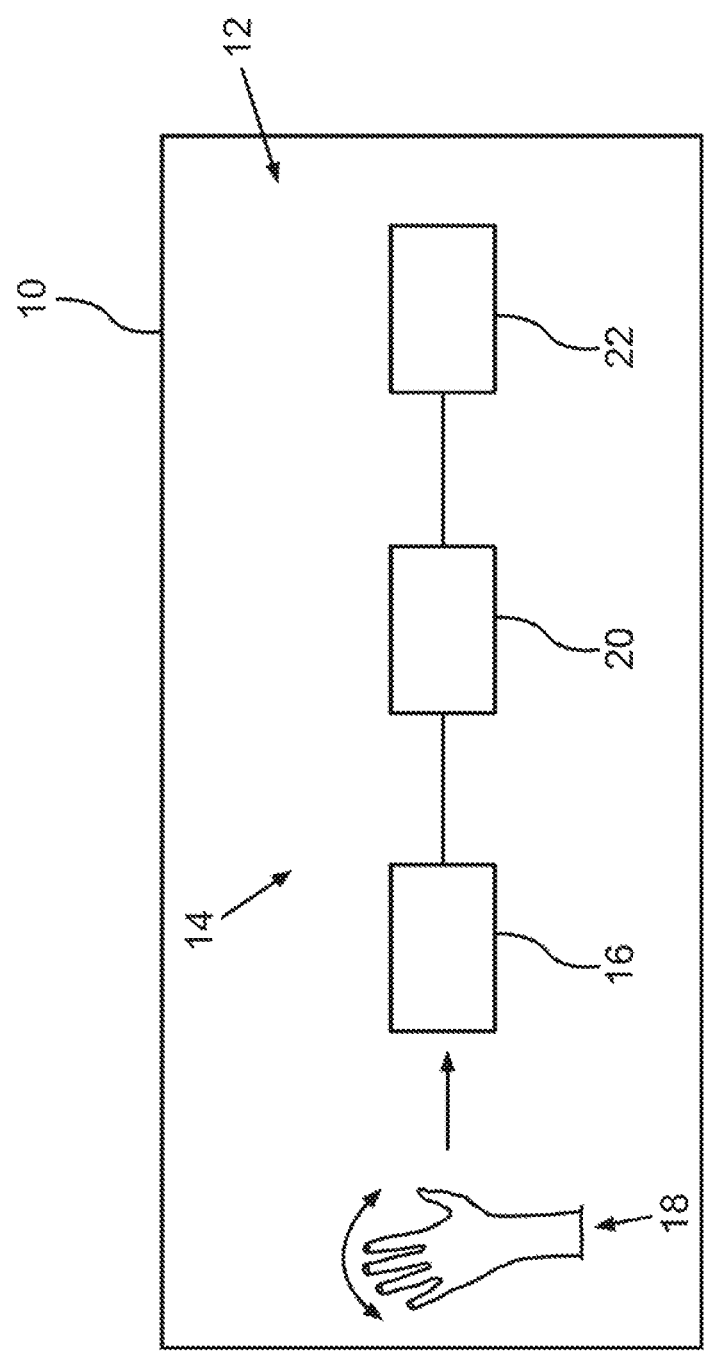
FIG. 1 is a schematic block diagram of the operator control system in an interior of a motor vehicle.

Reference will now be made in detail to the preferred embodiments, examples of which are illustrated in the accompanying drawings, wherein like reference numerals refer to like elements throughout.

FIG. 1 schematically depicts an operator control system 14 in an interior 12 of a motor vehicle 10. The motor vehicle 10 may be a motor car, particularly an automobile.

The operation of the operator control system 14 will now be explained below in conjunction with FIG. 2, which schematically depicts a sensing device 16 of the operator control system from FIG. 1.

The operator control system 14 includes the sensing device 16, which is designed to sense a body part 18 of a user and a gesture by the body part 18, indicated by the double-headed arrow in FIG. 1.

The sensing device 16 can include a camera, for example. In this case, the camera may be arranged on a roof of the motor vehicle 10 directly above a central console in the interior 12 of the motor vehicle 10, for example.

Figure 2:
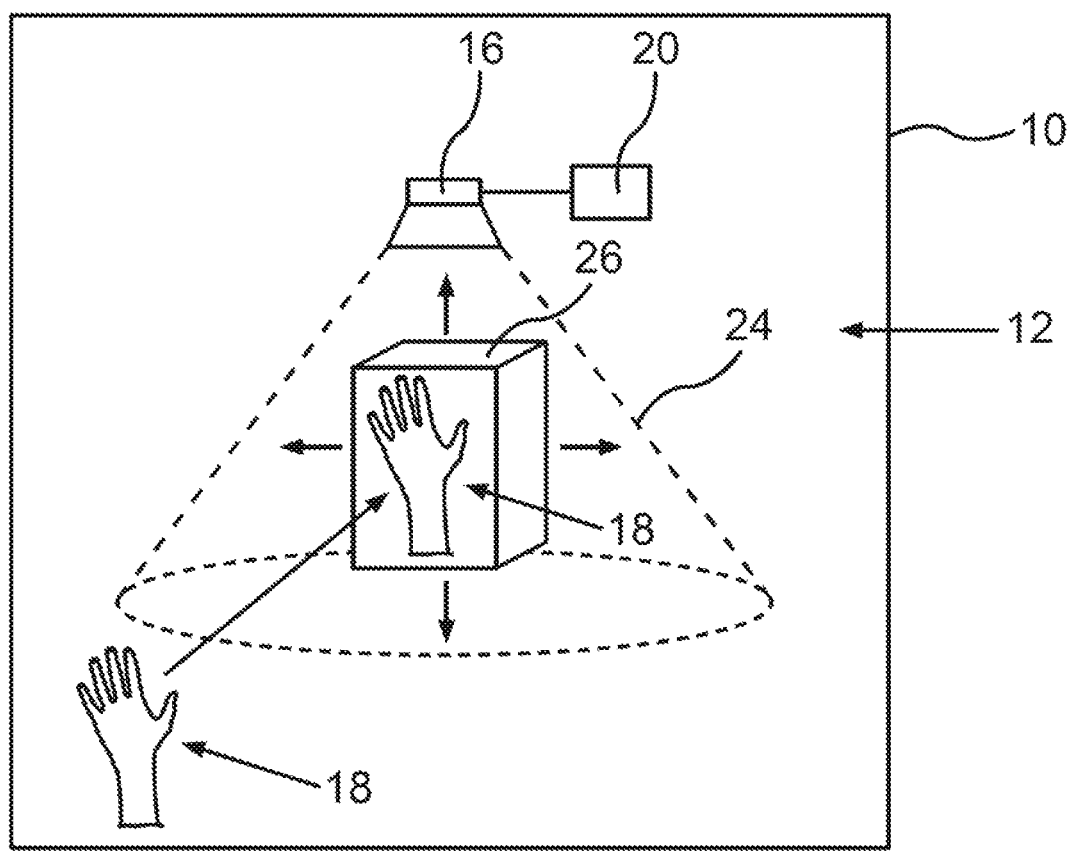
FIG. 2 is a schematic block diagram of a sensing device and a sensing region covered thereby with an operator control space arranged in the sensing region.

As depicted schematically in FIG. 2, the camera defines a sensing region 24 in which an item and/or a body part 18 can be sensed. Sensing region 24 is a three-dimensional region in the surroundings of the sensing device 16, i.e. in the interior 12 of the motor vehicle 10, which can be covered by the sensing device 16.

Provided inside the sensing region 24 is an operator control space 26. The operator control space 26 is therefore a subspace of the sensing region 24. The sensing device 16 is in an interior 12 of the motor vehicle 10 and, therein, takes up a predetermined three-dimensional region—the sensing region 24—in which an operator control space 26 stipulated by the sensing device 16 is in turn arranged as a subspace of the sensing region 24. The operator control space 26 can, as can be seen in FIG. 2, be in the form of a cuboid, for example. The operator control space 26 may also be in another geometric configuration. By way of example, the operator control space 26 can have the shape of a sphere or of a cone.

The operator control system 14 further includes a control device 20 and a signal apparatus 22. Depending on where and what the sensing device 16 senses inside the sensing region 24, the control device 20 actuates the signal apparatus 22 differently. The sensing device 16, the control device 20 and the signal apparatus 22 are in this case appropriately coupled or connected to one another wirelessly or by wire. The sensing device 16, for example the camera, is designed, in a manner known per se, to sense an item and/or a body part 18 of a user, for example a hand. Gestures, for example the gesticulation of a hand, can also be sensed by the sensing device 16. The sensing device 16 can sense gestures and/or a body part 18 by virtue of image data and/or video data, i.e. a sequence of image data, for example.

As already mentioned, the control device 20 can actuate the signal apparatus 22 differently, this being effected on the basis of where and what is sensed by the sensing device 16 inside the sensing region 24. The signal apparatus 22 can include a display device and/or an audible output device, for example. The display device can have, by way of example, one or more lamps and/or a display, which is arranged in a combined instrument of the motor vehicle 10, for example, so that the display device can be used to display visual signals. The audible output device can have one or more loudspeakers, for example, so that the audible output device can be used to output audible signals. If the signal apparatus 22 includes a display device, for example, then the display device may be arranged in a field of view of the user. In this case, the control device 20 distinguishes between four different display modes. Depending on where and what the sensing device 16 senses inside the sensing region 24, the signal apparatus 22 is actuated differently by the control device 20.

If the sensing device 16 senses a body part 18 of the user in the sensing region 24 but outside the operating control space 26, the signal apparatus 22 is operated in a first display mode. The signal apparatus 22 is operated in a second display mode if the sensing device 16 senses the body part 18 of the user in the operator control space 26. If the sensing device 24 senses a prescribed gesture by the user in the operator control space 26, the signal apparatus 22 is operated in a third display mode. To this end, the sensing device 16 compares stored video data with captured video data, for example. If the video data—stored and captured video data—match, then the gesture performed by the user is a prescribed gesture. If the sensing device 16 senses a different gesture from a prescribed operator control gesture in an operator control space 26, that is to say an operating error by the user, then the signal apparatus 22 is operated in a fourth display mode. A different gesture or operating error is identified when the captured video data differ from the stored video data.

In the first display mode, the control device 20 actuates the signal apparatus 22 such that the signal apparatus 22 is used to output an identification signal. Thus, the user receives an indication that he admittedly has his hand in the sensing region 24 of the sensing device 16 but is not yet in the operator control space 26 when he now wishes to operate the operator control system 14. If the signal apparatus 22 is a lamp, for example, then the lamp can light up yellow as an identification signal.

In the second display mode, the control device 20 actuates the signal apparatus 22 such that the signal apparatus 22 is used to output an acknowledgment when the hand is in the operator control space 26. As acknowledgment, the lamp can light up orange in the form of a visual signal, for example.

In the third display mode, the control device 20 actuates the signal apparatus 22 such that the signal apparatus 22 is used to output a confirmation signal. This is the case when a gesture is sensed in the operator control space 26 and the gesture matches at least one prescribed gesture. Thus, not only the presence of the hand in the operator control space 26 but also a gesture executed by the user is sensed. Thus, as already mentioned above, if the hand of the user is sensed in the operator control space 26, for example, then the lamp lights up yellow. If it is subsequently sensed that the user uses his hand to execute a prescribed gesture, then the color of the lamp changes from yellow to green as a confirmation signal.

In the fourth display mode, the control device 20 actuates the signal apparatus 22 such that the signal apparatus 22 is used to output a warning. Thus, if none of the prescribed gestures is sensed, for example after the sensing of a gesture by the user, for example by virtue of gesticulation with his hand, then the lamp of the signal apparatus 22 can change not from yellow to green for a prescribed gesture but rather from yellow to red in the event of an operating error, that is to say an unprescribed gesture.

By way of example, the signal apparatus 22 can also include three lamps that may be arranged next to one another in the field of view of the user. The first lamp can output the sensing signal in the first display mode, for example. The second lamp can output the visual acknowledgment, for example, in the second display mode. The third lamp can output a confirmation signal or a warning signal in the third and fourth display modes. If the user reaches into the sensing region 16 with his hand, for example, then this is indicated to him by the first lamp (first display mode), which glows yellow at this moment and for as long as the user has his hand in the sensing region 16. If the user moves his hand further into the operator control space 26, then this is indicated to him by the second lamp (second display mode), which glows orange at this moment and for as long as the user has his hand in the operator control space 26. If the user subsequently executes a gesture and the gesture is recognized as a prescribed gesture, this is signaled to him by the third lamp (third display mode), which glows green, for example. If the user executes an operating error for the prescribed gesture, this is also signaled to him by the third lamp by virtue of the color of the lamp changing from green to red (fourth display mode). If the user removes his hand from the operator control space 26 and the sensing region 24, all three lamps would go out in succession.

Instead of a lamp and/or a display as display device, the signal apparatus 22 can include a loudspeaker, for example. This allows the acknowledgment and/or the confirmation signal and/or the warning and/or the identification signal to be output as an audible signal.

After the signaling of the respective sensing states, the extent of the operator control space 26 can be adapted or varied by the control device 20, for example in order to increase user comfort. The adjustment of the operator control space 26 is indicated schematically in FIG. 2 by the arrows around the operator control space 26. The operator control space 26 can be "extended" only as far as the system limits of the sensing region—indicated by the dashed lines—allow. The extent of the operator control space 26 cannot be enlarged beyond the limits of the sensing region 24.

The operator control system 14 and the explained method for operating the operator control system 14 are thus used to considerably simplify gesture-based control of the operator control system 14. This is because firstly a user is provided with a visual and/or audible acknowledgment of whether he has positioned his hand correctly, for example, in order to be able to perform gesture control in the first place. Secondly, the user is additionally also provided with a visual and/or audible acknowledgment of whether he has just used his hand to execute a gesture that has or has not been recognized by the operator control system 14.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. An operator control system for a motor vehicle, comprising:
   a signal apparatus;
   a sensing device configured to sense at least one body part when the at least one body part is disposed in a sensing region of the sensing device, the sensing region being arranged in an interior of the motor vehicle; and
   a control device configured
   to control the signal apparatus of the operator control system,
   to check whether the at least one body part sensed in the sensing region is in an operator control space forming a three-dimensional sub-region of the sensing region, bounded by six planar sides,
   to alter an extent of the operator control space based on at least one prescribed criterion in a stored user profile,
   to actuate the signal apparatus to output an acknowledgment outside the operator control space when the sensing device senses the body part inside the operator control space, and
   to actuate the signal apparatus to output an identification signal when the sensing device senses the body part inside the sensing region but completely outside the operator control space, the identification signal indicating that the sensing device can identify and track the body part of the user.

2. The operator control system as claimed in claim 1, wherein the sensing device is further configured to sense an input gesture in the operator control space and to check whether the input gesture matches at least one prescribed gesture.

3. The operator control system as claimed in claim 2, wherein the control device is further configured to actuate the signal apparatus to output a confirmation signal when the input gesture matches the at least one prescribed gesture.

4. The operator control system as claimed in claim 3, wherein the control device is further configured to actuate the signal apparatus to output a warning when the input gesture differs from the at least one prescribed gesture.

5. The operator control system as claimed in claim 1, wherein the sensing device includes at least one of a 2D camera and a 3D camera.

6. The operator control system as claimed in claim 5, wherein the signal apparatus includes at least one of a display device and an audible output device.

7. The operator control system as claimed in claim 1, wherein the operator control space is a rectangular parallelepiped.

8. A motor vehicle, comprising:
a chassis; and
an operator control system, including
   a signal apparatus;
   a sensing device configured to sense at least one body part when the at least one body part is disposed in a sensing region of the sensing device, the sensing region being arranged in an interior of the motor vehicle; and
   a control device configured
      to check whether the at least one body part sensed in the sensing region is in an operator control space forming a three-dimensional sub-region of the sensing region, bounded by six planar sides,
      to alter an extent of the operator control space based on at least one prescribed criterion in a stored user profile,
      to actuate the signal apparatus to output an acknowledgment outside the operator control space when the sensing device senses the body part inside the operator control space, and
      to actuate the signal apparatus to output an identification signal when the sensing device senses the body part inside the sensing region but completely outside the operator control space, the identification signal indicating that the sensing device can identify and track the body part of the user.

9. The motor vehicle as claimed in claim 8, wherein the sensing device is further configured to sense an input gesture in the operator control space and to check whether the input gesture matches at least one prescribed gesture.

10. The motor vehicle as claimed in claim 9, wherein the control device is further configured to actuate the signal apparatus to output a confirmation signal when the input gesture matches the at least one prescribed gesture.

11. The motor vehicle as claimed in claim 10, wherein the control device is further configured to actuate the signal apparatus to output a warning when the input gesture differs from the at least one prescribed gesture.

12. The motor vehicle as claimed in claim 8, wherein the sensing device includes at least one of a 2D camera and a 3D camera.

13. The motor vehicle as claimed in claim 12, wherein the signal apparatus includes at least one of a display device and an audible output device.

14. The motor vehicle as claimed in claim 8, wherein the operator control space is a rectangular parallelepiped.

15. A method for operating an operator control system for a motor vehicle, comprising:
   sensing a body part by a sensing device when the body part is disposed in a sensing region of the sensing device, the sensing region being arranged in an interior of the motor vehicle;
   checking whether the body part sensed in the sensing region is in an operator control space forming a three-dimensional sub-region of the sensing region, bounded by six planar sides;
   altering an extent of the operator control space based on at least one prescribed criterion in a stored user profile;
   actuating a signal apparatus of the operator control system by a control device to output an acknowledgment outside the operator control space when the sensing device senses the body part inside the operator control space; and
   actuating the signal apparatus by the control device to output an identification signal when the sensing device senses the body part inside the sensing region but completely outside the operator control space, the identification signal indicating that the sensing device can identify and track the body part of the user.

16. The method as claimed in claim 15, further comprising:
   sensing an input gesture by the sensing device in the operator control space; and
   checking whether the input gesture matches at least one prescribed gesture.

17. The method as claimed in claim 16, further comprising actuating the signal apparatus by the control device to output a confirmation signal when the input gesture matches the at least one prescribed gesture.

18. The method as claimed in claim 17, further comprising actuating the signal apparatus by the control device to output a warning when the input gesture differs from the at least one prescribed gesture.

19. The method as claimed in claim 15, wherein the operator control space is a rectangular parallelepiped.

* * * * *